United States Patent
Aggarwal et al.

(10) Patent No.: US 6,477,180 B1
(45) Date of Patent: Nov. 5, 2002

(54) OPTIMIZING METHOD FOR DIGITAL CONTENT DELIVERY IN A MULTICAST NETWORK

(75) Inventors: Charu C. Aggarwal, Ossining, NY (US); Jayachandran Sethuraman, Cambridge, MA (US); Mark S. Squillante, Pound Ridge, NY (US); Joel L. Wolf, Katonah, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,341

(22) Filed: Jan. 28, 1999

(51) Int. Cl.⁷ .................................................. H04J 1/16
(52) U.S. Cl. ....................... 370/468; 370/473; 370/474; 370/242
(58) Field of Search ................................. 370/242–245, 370/468, 473, 474; 725/49, 54, 139, 151

(56) References Cited

U.S. PATENT DOCUMENTS

| | | | |
|---|---|---|---|
| 5,555,441 A | | 9/1996 | Haddad ....................... 455/4.2 |
| 5,557,798 A | * | 9/1996 | Skeen et al. .................. 705/35 |
| 5,673,256 A | | 9/1997 | Maine ......................... 370/271 |
| 6,005,561 A | * | 12/1999 | Hawkins et al. ............. 345/721 |
| 6,130,898 A | * | 10/2000 | Kostreski et al. ............ 370/522 |
| 6,229,802 B1 | * | 5/2001 | Hippelainen ................. 370/349 |
| 2001/0003828 A1 | * | 6/2001 | Peterson et al. ............. 709/219 |

\* cited by examiner

Primary Examiner—Hassan Kizou
Assistant Examiner—Tim Spafford
(74) Attorney, Agent, or Firm—F. Chau & Associates, LLP (57) ABSTRACT

A method for scheduling delivery of digital objects over a network, in accordance with the invention, includes the steps of providing a user interface for selecting objects to be transmitted thereto, selecting at least one object to be transmitted to the user interface, identifying and receiving in-progress object transmissions corresponding to the at least one selected object, identifying portions of the at least one object not yet received to request transmission of the portions of the at least one object not yet received and receiving remaining portions of the at least one object during additional in-progress transmissions. A system is also included.

24 Claims, 5 Drawing Sheets

OPTIMIZING METHOD FOR DIGITAL CONTENT DELIVERY IN A MULTICAST NETWORK

BACKGROUND OF THE INVENTION

1. Field of the Invention

The present invention relates to digital object delivery systems and, more particularly, to a system and method for optimizing transmission resources to provide efficient and profitable transmission of digital objects.

2. Description of the Related Art

With the increased popularity of e-commerce, many customers are now purchasing objects of an essentially digital nature on the world wide web. Typical examples of such objects include CDs containing music or other audio, and DVDs containing movies or other video. But there are many other examples, including video games and other software. At present customers who purchase such digital objects generally have the object sent to them via mail or a similar private delivery service. In the near future, it will probably become more economical and more satisfactory to deliver such digital objects electronically. The customer may receive the digital object more quickly, for example. The e-commerce merchant need not maintain or create a large inventory.

One major means of electronic delivery may involve utilizing spare bandwidth in a broadcast environment such as cable TV, satellite TV, or TV via the airwaves. In today's TV environment, for example, some spare bandwidth usually exists even when a channel is broadcasting normal programming, typically in the form of the so-called vertical blanking interval or VBI. Similarly, some channels will go "dark" in the middle of the night or possibly at other times, potentially leaving the entire channel bandwidth available for broadcasting digital objects.

Therefore, a need exists for a system and method for management and allocation of spare bandwidth in a manner which optimizes the revenue and ultimately the profits of e-commerce merchant's delivery service.

SUMMARY OF THE INVENTION

A method for scheduling delivery of digital objects over a network, in accordance with the invention, includes the steps of providing a user interface for selecting objects to be transmitted thereto, selecting at least one object to be transmitted to the user interface, identifying and receiving in-progress object transmissions corresponding to the at least one selected object, identifying portions of the at least one object not yet received to request transmission of the portions of the at least one object not yet received and receiving remaining portions of the at least one object during additional in-progress transmissions.

Another method for scheduling delivery of digital objects from a transmission source having a finite number of transmission channels having scheduled transmissions comprising the steps of providing a plurality of user interfaces having a capability for selecting digital objects to be transmitted from the transmission source, the transmission source providing cyclical transmissions of the digital objects over available channel bandwidth, selecting from a user interface an object to be transmitted to the user interface, identifying in-progress object transmissions corresponding to the selected object, receiving at least a portion of the selected object from the in-progress object transmissions, identifying remaining portions of the selected object not yet received to request transmission of the remaining portions of the object and receiving the remaining portions of the object during additional in-progress transmissions.

In alternate methods, the step of reassembling portions of the at least one object initially received and the remaining portions of the at least one object (reassembling portions of the selected object) may be included. The method may further include the step of transmitting the digital objects in cyclic order to be received by the user interface. A transmission source for transmitting the at least one object may be included and the step of managing channels of varying bandwidths and a plurality of objects which are to be delivered via these channels in accordance with costs which depend on achieved delivery time of the plurality of objects may also be included.

The methods may further include the step of determining when to deliver each object and which channel to use to carry each object such that a total amount of revenue obtained from the delivery of the objects is highly or the most profitable. The method may also include the steps of determining an amount of time needed to deliver an object pursuant to a request from the user interface, and offering delivery options which at least meet the amount of time. The method may include the steps of dynamically deciding which delivery times are profitable and offering a customer a number of delivery time options which have a highest profitability. The method may also include the step of discounting costs for delivery of the objects to encourage customers to choose among the number of delivery time options. The method may include the step of scheduling the delivery of the at least one object over a plurality channels such that the delivery of the at least one object is profitable.

A system for scheduling delivery of digital objects over a network includes at least one user interface for selecting objects to be transmitted thereto, the user interface for identifying and receiving in-progress object transmissions corresponding to the selected objects. A transmission source is employed for transmitting objects to the at least one user interface, the transmission source providing cyclical object transmissions. A scheduler manages usage of network channels and object transmission priority. The scheduler is responsive to requests of the at least one user interface to provide remaining portions of the selected objects not yet received during the in-progress transmission.

In alternate embodiments, the scheduler preferably manages channels of varying bandwidths and a plurality of objects which are to be delivered via these channels in accordance with costs which depend on achieved delivery time of the plurality of objects. The scheduler may include a mechanism for determining when to deliver each object and which channel to use to carry each object such that a total amount of revenue obtained from the delivery of the objects is profitable. The scheduler may include a mechanism for determining an amount of time needed to deliver an object pursuant to a request from the at least one user interface for offering delivery options which at least meet the amount of time. The scheduler preferably provides scheduling for the delivery of the objects over a plurality channels such that the delivery of the objects is profitable. The user interface may include a televison. The network may include a televison network, a satellite network or a cable network.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention includes a system and method for managing and allocating spare bandwidth in a manner which optimizes the revenue and ultimately the profits of the e-commerce merchants' delivery service. The present invention seeks to optimize profits by scheduling the broadcasts of various digital objects efficiently by controlling delivery price options offered to a given customer based on other outstanding activity and, by pricing the delivery options offered to a given customer based on other outstanding activity. These last two components of the present invention allow the e-commerce merchant to react to varying customer demands in a reasonable and profitable manner.

Although the bandwidth of each channel may vary over time, it does so very predictably according to predetermined schedules agreed upon by the TV stations (cable companies, etc.). This property of broadcasting via TV channels is quite valuable, since it allows for a high degree of certainty in scheduling. Furthermore, it can be safely assumed that the speedup of digital broadcast varies more or less linearly with bandwidth, since transmitting the digital objects involves very little overhead. Suppose, for example, that channel 1 has twice the bandwidth of channel 2. Then it will take approximately half as long to broadcast a digital object on channel 1 as on channel 2.

For the present invention, transmitting the digital object in arbitrarily ordered and arbitrarily sized partitioned segments is introduced, to be recombined at a set box via software and hardware, as necessary. Each customer has specialized hardware, most likely a set box, to perform these functions including an electronic disk or disks to store the digital object once it has been broadcast.

In one preferred embodiment of the present invention, the ordering is cyclic. In other words, the end of the digital objects is "glued" to the beginning of the object, forming a "circle" rather than an "interval". Then the transmission of the digital object for a particular customer occurs in cyclic segments, the first of which starts at some dynamically determined position in the object, the next of which starts where the first ends, and so on to the last segment, which starts where the next to last segment ends and ends where the first segment started, thus completing a full transmission of the digital object for that customer. However, alternative orderings are possible within the scope of the invention. Similarly, in one preferred embodiment of the invention, the starting point of the partition for a particular customer purchasing a digital object corresponds to the ending point of the previous customer purchasing that digital object, while the ending point for the particular customer corresponds to the current position in the transmission of that object. (Multiple arrivals of customers for a digital object during the same period of non-transmission get counted as a single partition segment, not as several segments.) This determines the sizes of partition segments for the digital object. Again, however, alternative sizes are possible within the scope of the invention.

In another preferred embodiment of the invention, the resulting partitioned segments are not preempted during transmission, though alternative embodiments involving arbitrary preemption are contemplated within for the present invention.

The customer may be offered the option of choosing an acceptable subset of a selection of transmission costs which depend on the time to complete delivery of the digital object. Pricing functions may be monotone (non-increasing) or have a fixed rate for each object ordered and delivered. Costs may be expressed as so-called step functions, and this scenario is illustratively employed in the present invention. For example, a customer may pay $3 for delivery within one hour, $2 for delivery more than one hour but within one day, $1 for delivery more than one day but within one week, and receive free delivery thereafter. Such step functions are monotone nonincreasing. Step functions are easier for the customer to select between options, and the step functions are comparable to current pricing schemes via mail and private delivery services. Of course, the total cost to the various customers equals the revenue to the e-commerce merchant.

Broadcasts of segments of the same digital object segment to multiple customers may be "batched" in accordance with the invention. That is, each relevant customer may receive the same broadcast of that particular digital object segment, with no extra expense to the e-commerce merchant. Batching provides great revenue benefits to the e-commerce merchant when delivering the more popular digital objects. Thus, multiple customers may be satisfied by a single transmission of the digital object segment. The revenue achieved by the e-commerce merchant by a single transmission equals the sum of the costs charged to each customer whose entire transmission is completed at the end of that segment. That is, the customer incurs cost only when all cyclic segments are completed, which is also the time at which the e-commerce merchant knows how much to charge.

Figure 1:
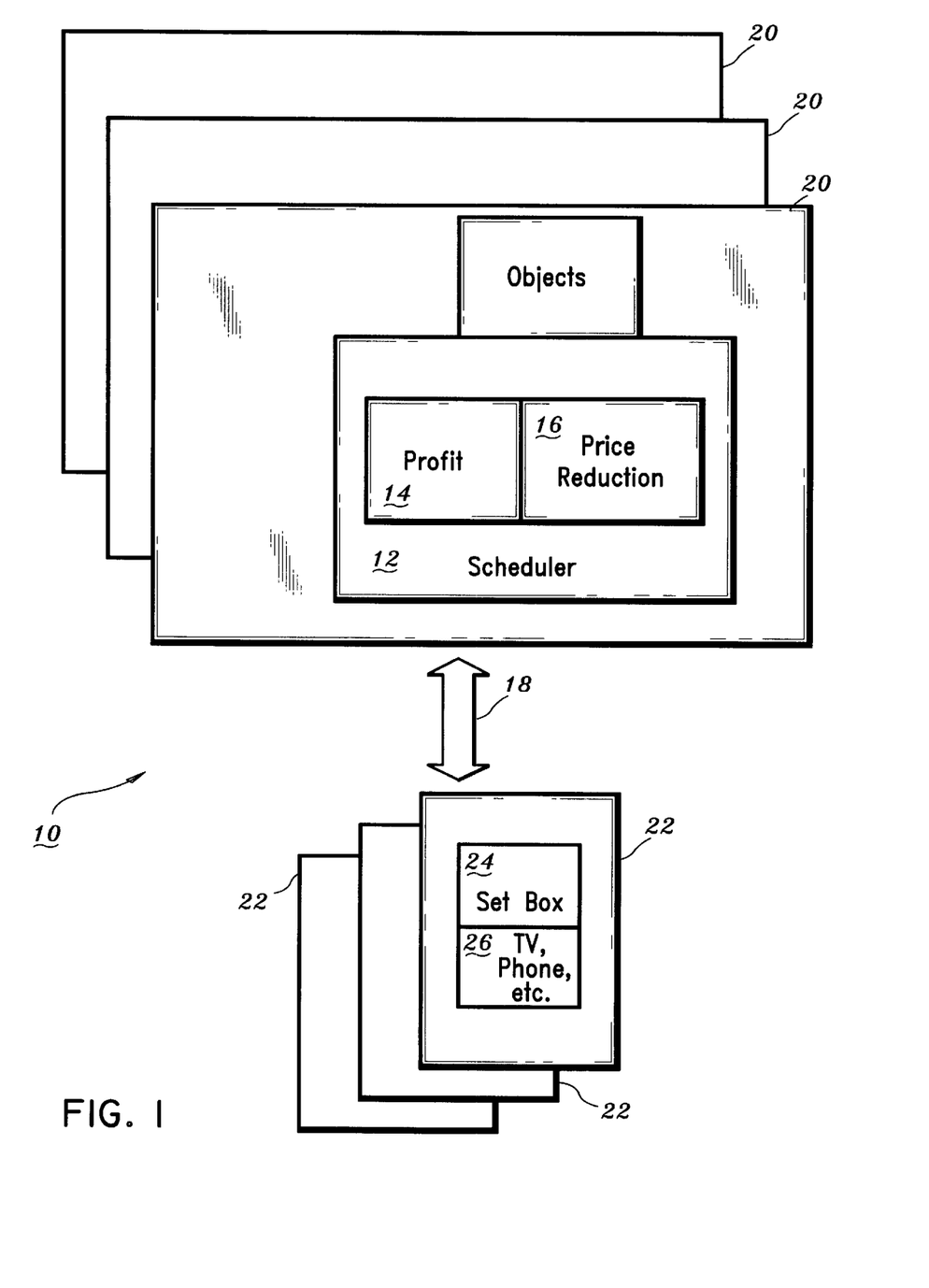
FIG. 1 is a block diagram of a preferred embodiment for a system for optimizing delivery of digital objects in accordance with the present invention.

Referring now to the drawings in which like numerals represent the same or similar elements and initially to FIG. 1, a block diagram of a system 10 in accordance with a preferred embodiment of the present invention is shown. System 10 includes an intelligent scheduler 12 for transmitting purchased digital objects to the customers. A profit component 14 is included which determines which, if any, standard transmission time pricing alternatives would not be profitable to offer to a given customer, either due to reasons of infeasibility or because if such times were actually achieved in a schedule, they would cause the e-commerce merchant to be less profitable by some predetermined amount. A price reduction component 16 is included which determines when it is a good idea to offer the customer reduced pricing, perhaps because the digital object purchased is identical to one already scheduled to be transmitted in the near future. If such "bargains" are to be offered, intelligent pricing strategies are determined. Profit component 14 and price reduction component 16 may depend heavily on the other outstanding activity at the moment the customer makes his purchase. System 10 includes a network 18 which may include a televison network, a telephone network, a satellite television network, a cable network and the like. Network 18 may include a plurality of transmission sources 20. Transmissions from transmission sources 20 are received by receivers or user interfaces 22 which may include televison sets 26, phones and the like. Each user interface 22 preferably includes a set box 24 which employs software and hardware to receive transmissions of digital objects ordered and delivered over network 18 from transmission sources 20. A more detailed description of these components follows.

Scheduler 12 seeks to build a high quality schedule for delivery of digital objects over a broadcast network to customers who arrive and make purchases at arbitrary times. Scheduler 12 is intended to be invoked iteratively. Scheduler 12 may, for example, be invoked after some predetermined number of new customer purchases, or perhaps after each customer purchase. Alternatively, scheduler 12 may be invoked after some predetermined time interval has elapsed. Again alternatively, scheduler 12 may be invoked after any of the network channels become free.

The embodiment where scheduler 12 is invoked when a channel becomes free will be used to illustratively describe in greater detail the present invention. When invoking scheduler 12, it is possible to honor previous scheduling decisions, to revisit all scheduling decisions, or combinations of both.

Figure 2A:
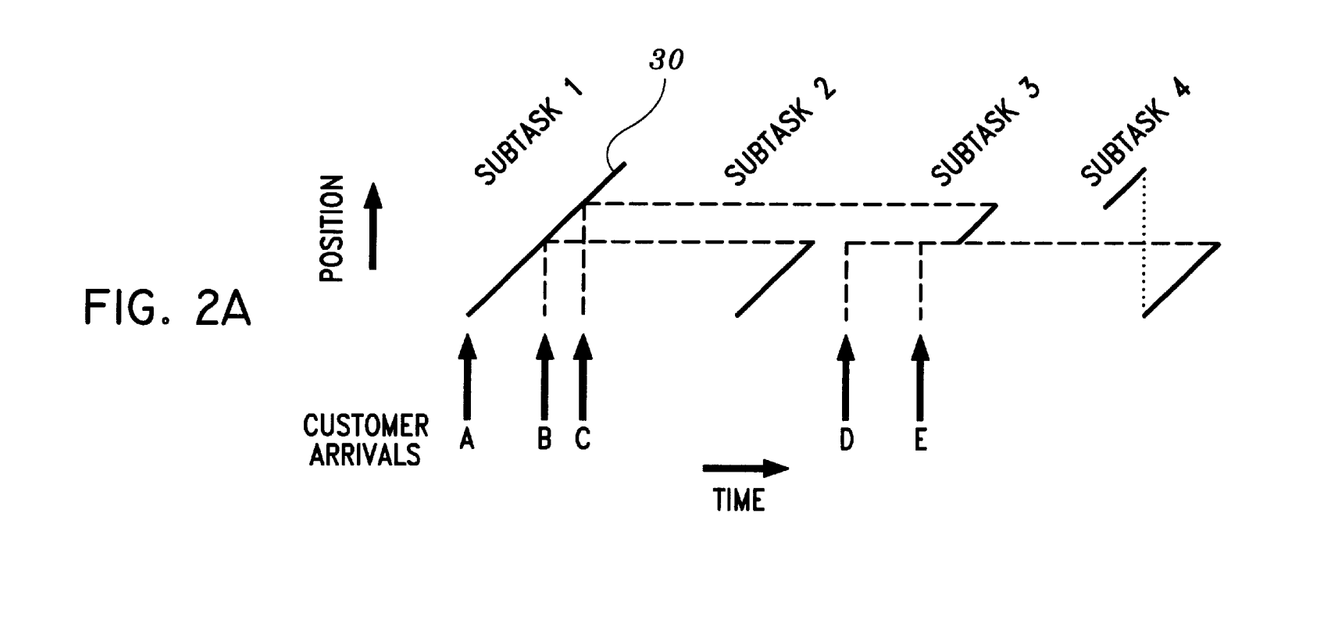
FIG. 2A is an illustrative cyclic subtask generation illustration for a particular digital object in accordance with the present invention.
Figure 2B:
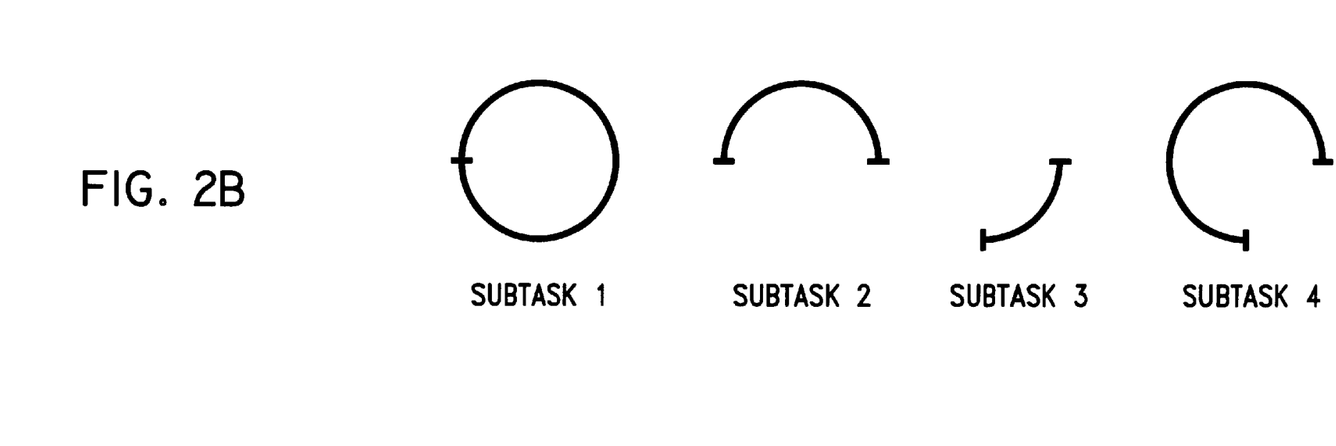
FIG. 2B illustratively shows the cyclic nature of the subtasks of FIG. 2A in accordance with the present invention.

Referring to FIGS. 2A and 2B, the creation of subtasks will now be described. The creation of subtasks, which taken together, correspond to transmission of the digital objects. The "size" (amount of work, in bits) for each subtask is to be determined. A digital object is considered in FIGS. 2A and 2B. Five different customers (A–E) purchase the same digital object at various points in time. Customer A makes the first purchase, and for simplicity it will be assumed that no previous customers for that digital object exist or are still active. So customer A spawns a single subtask, subtask 1, which transmits the digital object from beginning to end for this customer, as shown by line 30. During actual transmission of the digital object, customer B arrives. Customer B can immediately "piggyback" onto the transmission of the digital object for customer A, but also needs to receive the portion of the object which has already been missed. This leads to subtask 2, starting at the beginning of the digital object and running to a position equal to where customer B arrived. So full transmission of the digital object for customer B involves execution of a portion of subtask 1 and the complete execution of subtask 2. Customer C also arrives during transmission of subtask 1, spawning subtask 3. Full transmission of the digital object for customer C involves execution of a (smaller) portion of subtask 1, as well as full execution of subtasks 2 and 3. Customers D and E arrive during a period of non-transmission of the digital object from the position where subtask 3 ends to the end of the object, and resumed transmission of the digital object from the start of the object to the current position. (Effectively, the ends of the digital object are glued together.) Transmission of the digital object for customers D and E involves full execution of subtasks 3 and 4. FIG. 2B shows the circular nature of the various subtasks from a different perspective. Notice that each new subtask starts where the previous one ends. From a scheduling perspective, these subtasks are "cyclic", involving chain-like precedence. That is, the previous subtask associated with a given digital object needs to be finished before the next subtask is allowed to begin. This ensures that the segments of the digital object arrive in order at set box 24, making the job of "gluing" or reassembling the subtasks back together easier.

At a given moment in time (corresponding to a scheduler invocation) there are M distinct digital objects to be scheduled. Suppose that each digital object $1 \leq i \leq M$ involves $M_i$ subtasks to be executed in a chain precedence order. Suppose that each of N outstanding customers has purchased a digital object, and suppose there are P distinct channels. There is a natural "assignment" function A whose domain is the set of customers and whose range is the set of all subtasks. Specifically, for each customer $1 \leq k \leq N$, $A(k) = (A_1(k), A_2(k))$ is a pair, where $1 \leq A_1(k) \leq M$ is the digital object and $1 \leq A_2(k) \leq M_{A_1(k)}$ is the subtask for digital object $A_1(k)$ which completes the transmission for that customer. As noted before, this function may not be injective ("one to one", i.e., no two points are mapped to the same point), but it is surjective ("onto", i.e., all points in a target space are hit or used). For each digital object $1 \leq i \leq M$ and subtask $1 \leq j \leq M_i$, a composite cost function $h_{ij}(t)$ of time t measured from the start of the current scheduling invocation may be constructed. This composite function is preferably the sum of the cost functions for each customer k for which $A(k) = (i,j)$.

Figure 3:
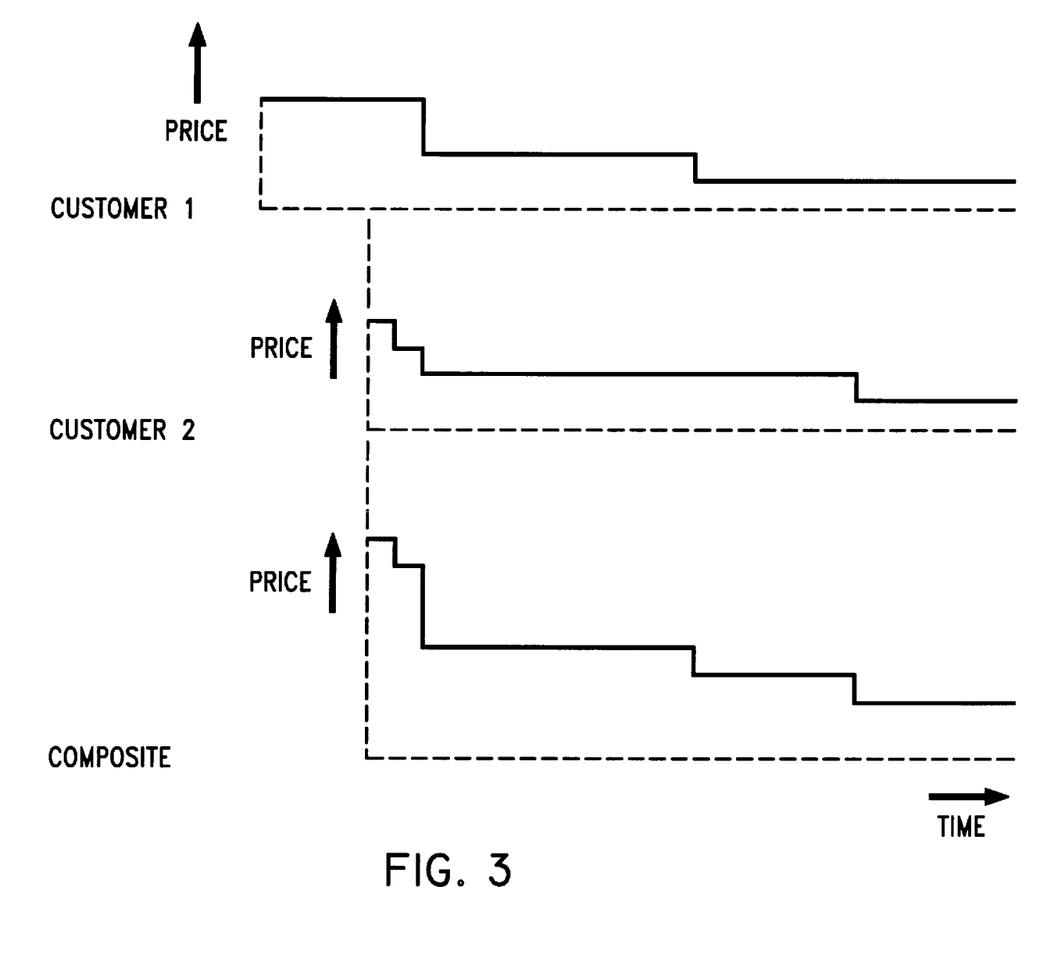
FIG. 3 depicts sample step functions corresponding to revenue for a broadcast task of a particular digital object including a composite sum of two individual step functions for two customers who have purchased that digital object in accordance with the present invention.

Referring to FIG. 3, a composite function is illustrated for an exemplary choice of customer delivery revenue step functions. In FIG. 3, each customer (1 and 2) may be offered a set of possible time windows for delivery, and a price which decreases for each successive time window. The customer chooses a subset of these possible times, and the choices for two customers who have ordered the same digital object and correspond to the same subtask are shown in the graph labeled Composite. It is assumed that digital object delivery for customer 1, who has arrived first, has not yet commenced at the current scheduler invocation time, which is, for simplicity, assumed to be at the arrival time of customer 2. (Customers 1 and 2 might correspond to customers D and E in FIG. 2A, for example).

Each customer contributes a step cost function to the overall mix for the schedule cost. Thus, the overall composite cost function (Composite) for this subtask is the sum of the two step functions (for customer 1 and customer 2) associated with the relevant individual customers, and this is itself a step function.

Figure 4:
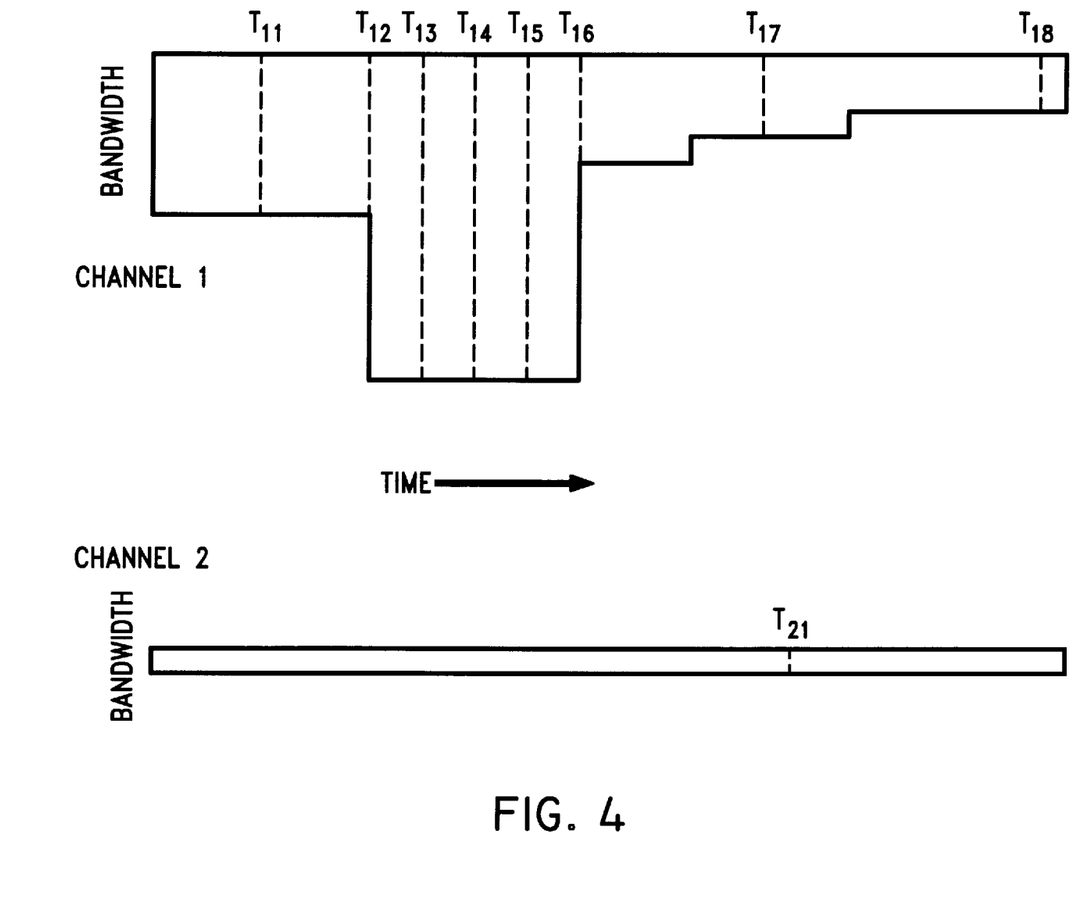
FIG. 4 depicts sample available channel bandwidths for two distinct channels, partitioned into time slots corresponding to equal amounts of work, which may vary over time.

The size (in bits) and transmission start time of a subtask are related to the time needed to complete its transmission. Referring to FIG. 4, two different channels are shown. Channel 1 varies in terms of available bandwidth over time. Channel 2 does not vary in terms of available bandwidth over time. Channel 1 has more available bandwidth at all times than channel 2 does.

The speedup is substantially linear with respect to bandwidth, and FIG. 4 shows the execution time of equal size subtasks. Thus, all transmission time intervals Ti have the same area. For example, channel 1 completes 8 transmissions of these equal sized subtasks in the time shown, at $T_{11}$ through $T_{18}$, and is working on the 9th subtask. Meanwhile channel 2 can only complete 1 such transmission, at time $T_{21}$, and is working on the 2nd subtask.

One goal of scheduler 12 is to maximize the total revenue (or equivalently, customer cost) across all digital objects being scheduled at the particular moment in time. This scheduling problem is technically hard from the perspective of computational complexity. (Officially, it belongs to the category of so-called NP-hard problems.) See for example, Garey, M. and Johnson, D., Computers and Intractability, W. H. Freeman and Company, 1979 incorporated herein by reference, for a discussion of the theory of NP-hard problems. Accordingly, the disclosed recipe is heuristic in nature, for example, a greedy heuristic.

Consider the scheduling of the next subtask or subtasks on channel $1 \leq l \leq N$. which has just become free. Due to precedence constraints, it is permitted to schedule any in-sequence subset of the form $(i,1), (i,2), \ldots, (i,J)$, where $1 \leq i \leq M$ and $1 \leq J \leq M_i$. If this subset is scheduled immediately and back-to-back on channel 1, due to the predictable nature of the channels, the times $S_{li1}, S_{li2}, \ldots, S_{lij}$ needed to complete each transmission may be readily computed. Thus completion of all of these transmissions needs time $S_{liJ} = \sum_{j=1}^{J} S_{lij}$. The total cost of scheduling this subset of tasks immediately is $\sum_{j=1}^{J} h_{ij}(S_{lij})$. Consider the times $t_{iJ1} \leq t_{iJ2} \leq \ldots \leq t_{iJQ_j}$ at which the step function $h_{ij}$ increases. This may be regarded as "pseudo-deadlines". The cost of scheduling the first $J-1$ subtasks $(i,1), (i,2), \ldots, (i,J-1)$ immediately and back-to-back on channel 1 and then leaving enough of a gap to just miss the mth pseudo-deadline for subtask $(i,J)$ is $[\sum_{j=1}^{J-1} h_{ij}(S_{lij})] + h_{iJ}(t_{iJm})$, assuming $t_{iJm} \geq S_{liJ}$.

Such a cost measures the optimal way of just missing the mth deadline for scheduling subtask $(i,J)$ while respecting the chain precedence. This cost is prorated by the ratio $S_{liJ}/t_{iJm} \leq 1$ of times, which measures the degree of slackness available in meeting the deadline in the first place. Now it is picked, amongst all $1 \leq i \leq M$, amongst all $1 < J < M_i$, and amongst all $1 < m < Q_J$ the triple which minimizes:

$$\frac{S_{liJ}}{t_{iJm}} \left[ \left[ \sum_{j=1}^{J-1} h_{ij}(S_{lij}) \right] + h_{iJ}(t_{iJm}) \right]. \quad (EQ.\ 1)$$

Note that the ratio of times on the left side of the formula is unitless, so this term measures (prorated) cost. The formula is "greedily" attempting to avoid infliction of the maximum possible amount of lost revenue, by meeting the relevant pseudo-deadline. To do this, the J subtasks of digital object i are scheduled immediately and back-to-back on channel l. If the set over which the optimization takes place is empty, it means there are no current subgroups of tasks which can meet their pseudo-deadlines. Observe that due to the predictable nature of the channels and subtasks, it is easy to compute the times at which each of the other channels will become available again. If any of these subtasks can then meet some of their pseudo-deadlines on any of the other (faster) channels, they are omitted from consideration. The optimization rule (EQ. 1) is applied to the other candidate subtasks, but the constraint $S_{liJ}/t_{iJm} \leq 1$ is relaxed. If all candidates have been eliminated by this criteria, the channel will temporarily not be scheduled.

There are many variations to the above method. For example, in one embodiment, an entire chain of subtasks which were chosen by the scheduler may be committed, or just the first subtask may be committed. The latter option allows the scheduler to revisit the decision at a later point, perhaps with more information (that is, with new subtasks to schedule). An additional constraint $a \leq S_{liJ}/t_{iJm} \leq 1$ may be applied for some predetermined constant a, which eliminates subtasks with too much slack from consideration for the time being. The scheduler may be invoked after each subtask has been transmitting for some fixed amount of time, possibly preempting the decisions already made.

Eliminating Pricing Alternatives

It is possible, due to previous scheduling commitments, that certain pricing alternatives may not be feasible for a customer at a given time. It is thus reasonable and prudent for an e-commerce merchant not to offer such pricing alternatives. More subtly, a pricing alternative may be feasible but not desirable for the e-commerce merchant. When a customer purchases digital objects, it is desirable to compute a minimum time $\tau_i$ possibly equal to the current time, at which the subtask associated with this customer can be profitably completed, and offer only pricing alternatives greater than or equal to $\tau$.

The present invention is capable of computing this value of $\tau$. In an illustrative embodiment, $\tau$ may be computed as follows. For any candidate $\tau$, a scheduling heuristic may be applied in an "experimental" mode, and under the assumption that all time slots for that subtask completing after time $\tau$ are restricted. After any set of scheduling decisions, it is easy to compute the times at which each of the channels will become available again. The scheduler may be invoked to make fictitious decisions about which subtask will be scheduled next, to advance virtual time to the next scheduling decision point, and to repeat.

Therefore, it may be determined whether any partial schedule can be completed to a schedule in which the subtask in question can be completed by time $\tau$ on a particular channel. If the method continues not to schedule the subtask in question, the number of channels on which it can be completed in sufficient time will gradually diminish. At the point at which that number would reach zero, one can bypass the decision of the method, and schedule the chain which ends with the subtask in question on the last acceptable channel. Then, the method continues through the remaining unscheduled subtasks in the usual manner. Comparing the value of the objective function (EQ. 1) for this solution with that of the solution without additional constraints, it can decide to accept or reject $\tau$ depending on whether these values are within some predetermined threshold of each other. A bracket and bisection technique may be employed to choose appropriate values of $\tau$ to test. For details on bracket and bisection techniques see, for example, Press, W., Flannery, B., Teukolsky, S. and Vetterling, W., Numerical Recipes, Cambridge University Press, 1986, incorporated herein by reference. Another reasonable strategy would be to only offer the earliest pricing alternatives to the more popular digital objects.

Offering Bargains to Encourage Pricing Alternatives

A customer may wish to purchase a digital object which has already been committed to be transmitted to a prior customer, or possibly one with single or multiple other customers for which would yield an earlier scheduled time for delivery. It may be advantageous to encourage the customer to choose the early time pricing alternatives. By offering bargains, e.g., lowering prices, this behavior can be encouraged. The probability of purchase may be estimated as a function of cost. By employing a probability of purchase versus cost relationship as collected based on marketing information, it is possible to optimize the expected profit achieved by the e-commerce merchant, and pick the reduced costs accordingly.

Other methods may be employed which provide incentives to customers to further optimize bandwidth of the transmission off digital objects.

Figure 5:
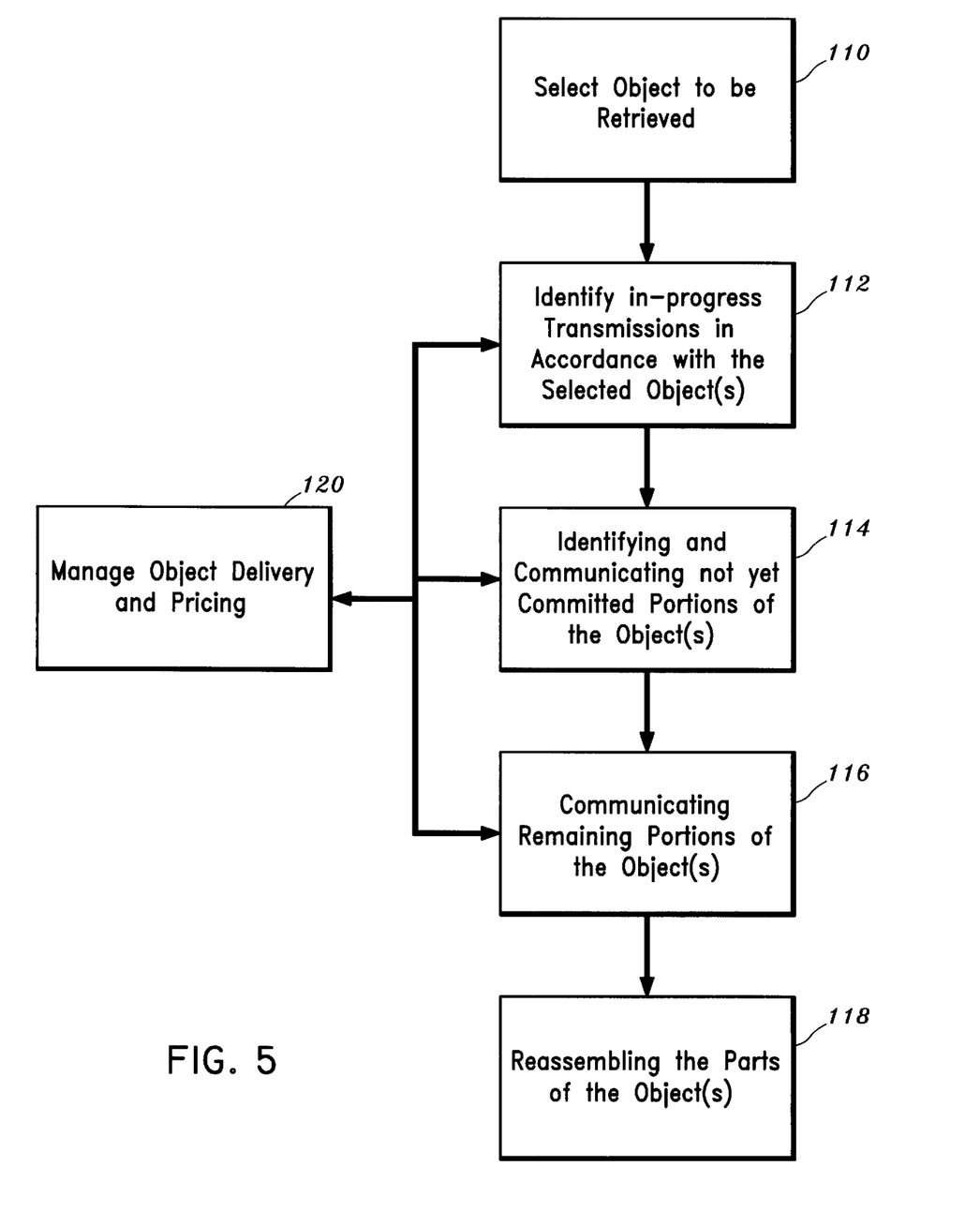
FIG. 5 is a flow diagram showing a method for scheduling delivery of digital objects over a network in accordance with the present invention.

Referring now to FIG. 5 and also to FIG. 1, a flow diagram for a method for optimizing the delivery of digital objects over a network, in accordance with the present invention is shown. In a block 110, a request for receiving digital objects is placed from a user interface 22. User interface 22 may include a set box 24 (FIG. 1) for a television set or a personal computer which can interact with a televison or cable network. A menu or program information is displayed on television set or the set box. The displayed information preferably includes digital objects to be downloaded. Digital objects may include movies, videos, audio tracks, or any other stored media transmittable over a network 18. Network 18 preferably schedules transmission of digital objects in accordance with a programming schedule or network downtime. Network 18 includes a transmission source 20 which transits digital objects preferably in a cyclical fashion. In this way, transmission of various objects can be performed continuously over a plurality of channels. In block 112, in-progress transmissions of requested digital objects are identified by set box 24. In this way, customers may "piggy-back" their order to digital objects which are cyclically transmitted and/or have already begun to be transmitted. Advantageously, this more efficiently utilizes network resources and provides increased profit margin for merchants selling the digital objects.

In block 114, set box 24 identifies not yet committed portions of the digital object and communicates to transmission source 20 which portions are missing. In block 116, transmission source communicates the remainder of the digital object by coordinating downloading by set box with the transmission of the remaining portion of the digital object. In block 118, the digital object is reassembled to include all portions of the digital object. The digital object is now capable of use by the customer.

In block 120, a scheduler 12 makes decisions for transmission sources 20 having multiple channels, which may vary in bandwidth. Scheduler 12 is used to schedule delivery of the digital objects and determine which digital objects are to be delivered via which channels. Scheduler 12 preferably utilizes cost functions to estimate which channels are to be used to maximize profits by, for example, increasing delivery speeds for the most popular digital objects. Scheduler 12 estimates costs and may influence prices depending on delivery times which can be achieved.

Scheduler 12 optimally schedules the delivery of the pending digital objects. Scheduler 12 preferably determines when to deliver each digital object and which channel will carry each digital object, thereby maximizing the total amount of revenue obtained in the delivery of the digital objects by determining the most expedient channel(s) to use. Such scheduling may be performed in accordance with EQ. 1, for example. Scheduler 12 preferably dynamically decides which of the alternate delivery times for a customer will be best from an overall profit perspective, and may only offer the customer those options. Further, by dynamically deciding which alternate delivery times for a customer will be best from an overall profit perspective, and intelligently discounting the costs for such delivery times in an effort to encourage the customer to choose amongst those times, additional profits may be achieved.

Scheduler 12 provides calculations for predetermining a minimum reasonable amount of time ($\tau$) needed to deliver a digital object by request of a customer, and only offering to the customer those delivery options which meet or exceed the predetermined amount of time.

Having described preferred embodiments of a system and method for optimizing for digital content delivery in a multicast network(which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for scheduling delivery of digital objects over a network, comprising the steps of:

providing a user interface for selecting objects to be transmitted thereto;

selecting at least one object to be transmitted to the user interface;

identifying and receiving in-progress object transmissions corresponding to the at least one selected object;

identifying portions of the at least one object not yet received by the user interface;

scheduling transmission of the portions of the at least one object not yet received; and receiving remaining portions of the at least one object during scheduled time periods.

2. The method as recited in claim 1, further comprises the step of reassembling portions of the at least one object initially received and the remaining portions of the at least one object.

3. The method as recited in claim 1, further comprises the step of transmitting the digital objects in cyclic order to be received by the user interface.

4. The method as recited in claim 1, further comprises a transmission source for transmitting the at least one object the method further comprising the step of managing channels of varying bandwidths and a plurality of objects which are to be delivered via these channels in accordance with costs which depend on achieved delivery time of the plurality of objects.

5. The method as recited in claim 4, further comprises the step of determining when to deliver each object and which channel to use to carry each object such that a total amount of revenue obtained from the delivery of the objects is profitable.

6. The method as recited in claim 4, further comprises the steps of determining an amount of time needed to deliver an object pursuant to a request from the user interface, and offering delivery options which at least meet the amount of time.

7. The method as recited in claim 4, further comprises the steps of dynamically deciding which delivery times are profitable and offering a customer a number of delivery time options which have a highest profitability.

8. The method as recited in claim 7, further comprises the step of discounting costs for delivery of the objects to encourage customers to choose among the number of delivery time options.

9. The method as recited in claim 1, further comprises the step of scheduling the delivery of the at least one object over a plurality channels such that the delivery of the at least one object is profitable.

10. A method for scheduling delivery of digital objects from a transmission source having a finite number of transmission channels having scheduled transmissions, comprising the steps of:

providing a plurality of user interfaces having a capability for selecting digital objects to be transmitted from the transmission source, the transmission source providing cyclical transmissions of the digital objects over available channel bandwidth;

selecting from a user interface an object to be transmitted to the user interface;

identifying in-progress object transmissions corresponding to the selected object;

receiving at least a portion of the selected object from the in-progress object transmissions;

identifying remaining portions of the selected object not yet received;

scheduling transmission of the remaining portions of the object; and receiving the remaining portions of the object during scheduled time periods.

11. The method as recited in claim 10, further comprises the step of reassembling portions of the selected object.

12. The method as recited in claim 10, further comprises the step of managing channels of varying bandwidths and a plurality of objects which are to be delivered via these channels, in accordance with costs which depend on achieved delivery time of the plurality of objects.

13. The method as recited in claim 12, further comprises the step of determining when to deliver each object and which channel to use to carry each object such that a total amount of revenue obtained from the delivery of the objects is profitable.

14. The method as recited in claim 12, further comprises the steps of determining an amount of time needed to deliver an object pursuant to a request from the user interface, and offering delivery options which at least meet the amount of time.

15. The method as recited in claim 12, further comprises the steps of dynamically deciding which delivery times are profitable and offering a customer a number of delivery time options which have a highest profitability.

16. The method as recited in claim 15, further comprises the step of discounting costs for delivery of the objects to encourage customers to choose among the number of delivery time options.

17. The method as recited in claim 10, further comprises the step of scheduling the delivery of the selected object over a plurality channels such that the delivery of the selected object is profitable.

18. A system for scheduling delivery of digital objects over a network, comprising:

at least one user interface for selecting objects to be transmitted thereto, the user interface for identifying and receiving in-progress object transmissions corresponding to the selected objects;

a transmission source for transmitting objects to the at least one user interface, the transmission source providing cyclical object transmissions; and a scheduler for managing usage of network channels and object transmission priority, the scheduler for scheduling requests of the at least one user interface to provide to the user interface remaining portions of the selected objects not yet received during scheduled time periods.

19. The system as recited in claim 18, wherein the scheduler manages channels of varying bandwidths and a plurality of objects which are to be delivered via these channels in accordance with costs which depend on achieved delivery time of the plurality of objects.

20. The system as recited in claim 18, the scheduler further comprises means for determining when to deliver each object and which channel to use to carry each object such that a total amount of revenue obtained from the delivery of the objects is profitable.

21. The system as recited in claim 18, the scheduler further comprises means for determining an amount of time needed to deliver an object pursuant to a request from the at least one user interface for offering delivery options which at least meet the amount of time.

22. The system as recited in claim 18, wherein the scheduler provides scheduling for the delivery of the objects over a plurality channels such that the delivery of the objects is profitable.

23. The system as recited in claim 18, wherein the user interface includes a televison.

24. The system as recited in claim 18, wherein the network includes one of a televison network, a satellite televison network and a cable network.

* * * * *